(12) United States Patent
Bohleber et al.

(10) Patent No.: US 10,245,621 B2
(45) Date of Patent: Apr. 2, 2019

(54) SORTING INSTALLATION AND METHOD FOR SEPARATING MATERIAL FRACTIONS

(71) Applicant: Unisensor Sensorsysteme GmbH, Karlsruhe (DE)

(72) Inventors: Jurgen Bohleber, Buhl-Neusatz (DE); Alfred Schmidt, Weingarten (DE)

(73) Assignee: Unisensor Sensorsysteme GmbH, Karlsruhe (DE)

( * ) Notice: Subject to any disclaimer, the term of this patent is extended or adjusted under 35 U.S.C. 154(b) by 0 days.

(21) Appl. No.: 15/504,907

(22) PCT Filed: Aug. 19, 2015

(86) PCT No.: PCT/EP2015/069081
§ 371 (c)(1),
(2) Date: Feb. 17, 2017

(87) PCT Pub. No.: WO2016/026908
PCT Pub. Date: Feb. 25, 2016

(65) Prior Publication Data
US 2017/0259305 A1    Sep. 14, 2017

(30) Foreign Application Priority Data

Aug. 20, 2014   (DE) .................. 10 2014 111 871

(51) Int. Cl.
*B07C 5/342* (2006.01)
*B07C 5/02* (2006.01)
*B07C 5/36* (2006.01)

(52) U.S. Cl.
CPC ............ *B07C 5/342* (2013.01); *B07C 5/02* (2013.01); *B07C 5/368* (2013.01); *B07C 2501/0054* (2013.01)

(58) Field of Classification Search
CPC ........... B07C 5/342; B07C 5/02; B07C 5/368; B07C 2501/0054
See application file for complete search history.

(56) References Cited

U.S. PATENT DOCUMENTS 3,009,571 A * 11/1961 Roberts, Jr. ........... B07C 5/3425
                                                  209/560
6,060,677 A *  5/2000 Ulrichsen ............... B07C 5/342
                                                  209/577

(Continued)

FOREIGN PATENT DOCUMENTS

DE      19816881       10/1999
DE      10149505       4/2003

(Continued)

*Primary Examiner* — Joseph C Rodriguez
*Assistant Examiner* — Kalyanavenkateshware Kumar
(74) *Attorney, Agent, or Firm* — Volpe and Koenig, P.C.

(57) ABSTRACT

In order to achieve a higher material throughput and/or a higher sorting speed in a sorting installation (10) for use in plastics recycling, it is provided, in the case of an apparatus which is intended for separating one or more material fractions from at least one material stream of free-flowing bulk material and which has a directing device (12), via which the material stream is guided under the action of gravitational force, also has an optical sensing device (16) for the spectroscopic detection of composition- or condition-dependent properties of individual fractions (13) contained in the material stream, and additionally has a separation device (14), by which the individual fractions (13) contained in the material stream are separated mechanically in dependence on detection results of the optical sensing device (16). Here, the directing device (12) is designed in the form of a shell surface of a rotational solid or truncated pyramid, which widens downwards, and the optical sensing device (16) is arranged in a scanning plane below the rotational solid or truncated pyramid.

12 Claims, 4 Drawing Sheets

(56) References Cited

U.S. PATENT DOCUMENTS

| | | | |
|---|---|---|---|
| 6,914,678 B1 * | 7/2005 | Ulrichsen | B07C 5/342 |
| | | | 356/429 |
| 7,564,023 B2 * | 7/2009 | Blagden | B07C 5/10 |
| | | | 250/222.2 |

FOREIGN PATENT DOCUMENTS

| | | |
|---|---|---|
| JP | 2001009384 | 1/2001 |
| WO | 2005018835 | 3/2005 |

\* cited by examiner

SORTING INSTALLATION AND METHOD FOR SEPARATING MATERIAL FRACTIONS

BACKGROUND

The present invention relates to a device and to a corresponding method for separating one or a plurality of material fractions from at least one material stream of free-flowing bulk material.

Such a method and a corresponding device, respectively, are used inter alia for sorting material mixtures, in particular of plastics materials, for the purpose of recycling. The material mixture to be sorted herein is composed of recycling material such as beverage bottles, foodstuff packaging, or other plastics-material items, for example from old electronic appliances or from automobile recycling, that has been comminuted to fragments. The individual fragments that are contained in the material mixture herein have to be sorted according to the type of plastics material and optionally according to other properties such as color, degree of contamination, or similar, so as to harvest therefrom homogeneous and recyclable material fractions.

Hereby, a material stream of the material mixture to be sorted is optically scanned and subjected to spectroscopic identification. The individual fragments that are contained in the material stream by means of their material properties thus detected are then mechanically separated in that said fragments are selectively deflected to different selection channels.

A method and a corresponding device for separating plastics materials, in which a material stream of the plastics materials that are comminuted to fragments is conveyed on a transportation belt, are known from publication DE 198 16 881. The material stream herein is scanned line-by-line perpendicularly to the transportation direction by way of a laser beam, and the optical radiation that is remitted by the fragments is spectroscopically analyzed. The individual fragments by virtue of the identification results are classified into different groups, and are separated into separate fractions by a separation system, for example by way of synchronized nozzles.

Publication DE 101 49 505 discloses a sorting apparatus for plastics materials, in which a material stream from plastics-material fragments under the influence of gravity is guided across an incline. The material stream on its way along the incline is analyzed by way of an optical spectrometer, and the individual fragments are separated into at least two material fractions at the end of the incline by way of a separation unit that is operated with nozzle jets.

A disadvantage of the sorting installations known in the prior art lies in that only a relatively low material throughput can be achieved with the former. In this way, the belt speed cannot be arbitrarily increased in the case of a sorting installation having a mechanical transportation belt, or a higher belt speed leads to increased belt wear, respectively, on the one hand. In the case of an incline being used, the mutual overlap of the fragments which would lead to a poor or erroneous sorting result, respectively, limits the mass stream which can be infed to the incline. The mass throughput is thus limited by the geometric dimensions of the incline. Moreover, the variable spacing between the scanner and the fragment in the case of optical scanning of the fragments leads to a "tangent error" during scanning.

In order for the large mass streams that are required for an economical operation in the case of an application for recycling plastics materials from old electronic appliances or automobiles, for example, to be managed, an object of the invention lies in providing a device and a method of the type mentioned at the outset by way of which a higher material throughput or a higher sorting speed, respectively, may be achieved.

SUMMARY

According to the invention, in the case of a device for separating one or a plurality of material fractions from at least one material stream of free-flowing bulk material, said device having a directing apparatus by way of which the material stream is guided under the influence of gravity, an optical scanning apparatus for the spectroscopic identification of composition-dependent or consistency-dependent properties of individual fragments that are contained in the material stream, and a separation apparatus for mechanically separating the individual fragments that are contained in the material stream, depending on the identification results of the optical scanning apparatus, the object is achieved in that the directing apparatus is configured as the shell surface of a downwardly widening three-dimensional rotational solid or truncated pyramid, and in that the optical scanning apparatus in the axial projection of the three-dimensional rotational solid or truncated pyramid, respectively, is disposed in the base area of the latter.

In that the shell surface of a downwardly widening three-dimensional solid instead of a two-dimensional and substantially belt-shaped geometry is chosen for the directing apparatus, the effective available area for transporting, singularizing, and analyzing the fragments of a material stream may be significantly increased at the same system size. Moreover, in that the optical scanning apparatus is disposed within the base area of the three-dimensional solid, the entire material stream that moves past in an annular manner in the down dip about the scanning apparatus may be detected by way of rotational optical scanning. The material stream, or the material streams, respectively, are thus scanned from the inside out. This enables a substantially higher material throughput than in the case of systems to date, because of the minor spacing between the scanner optics and the measured object simultaneously enabling very good optical identification results, or an identification with a low error rate, respectively. Scanning by means of a rotating scanner beam herein enables continuous scanning in which all measurements are performed in an identical manner all around.

The optical scanning apparatus comprises a light source for generating a light beam, and a rotating optical deflection element which is disposed so as to deflect the light beam in such a manner that the latter intersects the material stream that is distributed by the directing apparatus below the singularizing apparatus in a scanning plane which is preferably parallel with the base area of the rotational solid or truncated pyramid, respectively. Thus, optical scanning across full 360° is implemented by a rotating light beam within a scanning plane. Helical scanning of the dropping material stream is established by way of the falling movement of the fragments that is superimposed on the circular movement of the scanning beam. The scanning frequency may be adapted to the falling speed or the sliding speed, respectively, and the particle size of the fragments by a suitable choice of the rotational speed.

The best possible scanning results may be achieved if and when the optical deflection element is disposed so as to rotate about the axis of the rotational solid or truncated pyramid, respectively, and deflects the light beam out of the axis of the rotational solid or truncated pyramid, respectively, into the scanning plane, since the light path from the deflection element to the dropping fragments is equal for all rotational angles.

Moreover, a beam splitter which deflects fluorescent and scattered light that is reflected from the material stream in the reverse direction via the deflection element to a spectroscopic evaluation unit may be provided in the light path between the light source and the rotating optical deflection element. A very compact construction may be achieved in this manner since the light paths from the light source to the material stream to be scanned and back to the spectroscopic evaluation unit are largely congruent. Moreover, in both directions the same optics for focusing or collimating, respectively, the light may be used in the outward and the reverse direction, respectively.

Moreover, it is advantageous if an optical focusing unit which focuses the light beam onto a circle in which said light beam intersects the material stream is provided in the light path.

The bulk material which is to be guided by way of the directing apparatus may be filled into one or a plurality of silos that are disposed above the directing apparatus. One or a plurality of vibration conveyors which preferably are located below the silo(s) and are assigned to the latter serve for infeeding the bulk material to the directing apparatus in a metered manner in order for the material stream to be generated. Other types of conveying from the silo(s), for example by screw conveyors, may also be conceivable as an alternative to the use of vibration conveyors.

A plurality of sector-shaped silos from which material streams are separately guided by way of the directing apparatus may be disposed above the directing apparatus. In this instance, two or more respective selection channels that are disposed on different radii from the axis of the rotational solid or truncated pyramid, respectively, are provided for each of the silos below the directing apparatus. In this manner, the sorting installation may be supplied simultaneously with dissimilar material mixtures, or dissimilar material fractions may be sorted from the material streams that come from the individual silos, respectively. In this way, for example, PET may be infed from one material stream, and PP may be sorted from another material stream, both being infed to recycling. Moreover, the directing apparatus may have substantially vertically running separation webs for separating dissimilar material streams en route along the directing apparatus.

The separation apparatus is preferably formed by a multiplicity of compressed-air nozzles that are disposed along a circumferential line that is below the directing apparatus and that are selectively actuatable by way of respective valves, so as to deflect the individual fragments that are contained in the material stream by compressed-air surges. For example, the compressed-air nozzles may be actuated such that all undesirable "negative material" is deflected, that is to say blown out, so to speak, and lands in a selection channel that, when viewed from the axis of the directing apparatus, is on a larger diameter, while the desired fragments that have been identified as "positive material" are dropped in a non-deflected manner in a straight line from the material stream into a respective selection channel. By way of compressed-air surges from dissimilar directions, for example toward the front and toward the rear, it is also possible for dissimilar material fractions to be simultaneously separated from the material stream and to be deflected into dissimilar selection channels.

The optical scanning apparatus is advantageously configured for identifying and distinguishing fragments of a particle size up to 200 mm, wherein fragments that are smaller than 5 mm may also be identified. In that particularly large fragments up to approximately 200 mm are admitted the material throughput of the usual sorting installation in relation to systems that sort fragments of a size of approximately 20 mm may be significantly increased.

The sorting accuracy of the sorting installation depends inter alia also on the rotational speed of the optical deflection element. The higher said speed may be chosen, the tighter the potential helix of the measurements by way of which the material stream is scanned. In the case of one preferred configuration of the invention, the rotating optical deflection element has a drive which is configured for driving the deflection element at a frequency of more than 2000 revolutions per minute, preferably more than 5000 revolutions per minute, and most preferably at a frequency of up to 15,000 revolutions per minute. In order for the bearings of the drive and of the deflection element not to be excessively stressed herein, the rotating components of the drive, and the deflection element, should be configured or balanced, respectively, such that the latter do not have any unbalanced masses.

In the context of the present invention, particularly good identification results are achieved by using multi-line lasers or collinear laser-light bundles of dissimilar wavelengths. Particularly preferably, a light beam having preferably three wavelengths that is generated by means of frequency multiplication from the laser light of a laser-light source is used, wherein at least one scanning wavelength is in the ultraviolet range. The use of a plurality of wavelengths predominantly in the UV range by virtue of the high energy of the individual light quanta delivers particularly good identification results by way of which comparatively high energy levels of the radiated material may also be excited. Moreover, fragments from black material may also be sorted by way of the wavelengths mentioned.

In the case of one preferred embodiment, laser light from a YAG laser is employed, three different scanning wavelengths in the green and the UV range being generated from the laser light of the former by frequency multiplication by means of respective optical crystals. The wavelengths of 532 nm, 354 nm, and 266 nm have proven successful as scanning wavelengths, the former being able to be generated from the basic wavelength of a YAG laser of 1064 nm by frequency doubling, frequency tripling, and frequency quadrupling.

BRIEF DESCRIPTION OF THE PREFERRED EMBODIMENTS

Further advantageous refinements and advantages of the invention will be described on connection with the exemplary embodiments and of the appended drawings in which.

DETAILED DESCRIPTIONS OF THE PREFERRED EMBODIMENTS

Figure 1:
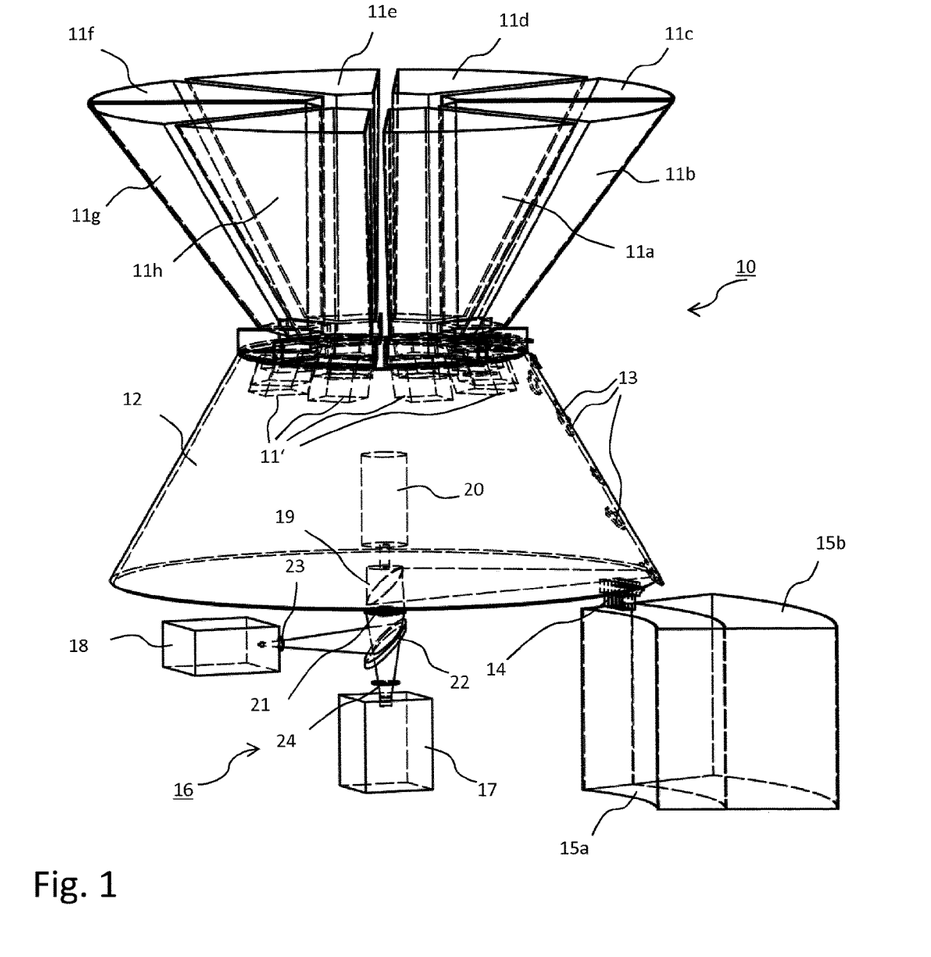
FIG. 1 shows an isometric view of a rotationally symmetrical sorting installation having a directing apparatus of a truncated-cone shape.
Figure 2:
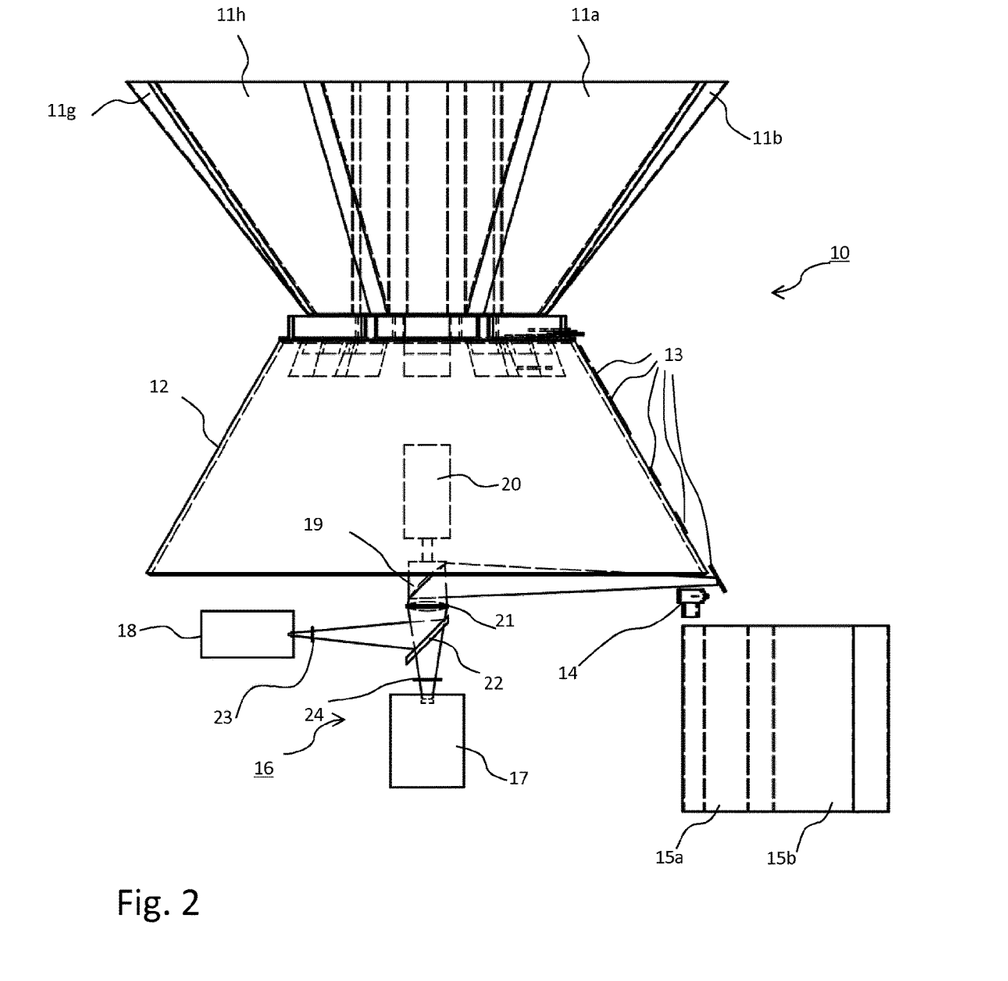
FIG. 2 shows a side view of the sorting installation of FIG. 1.
Figure 3:
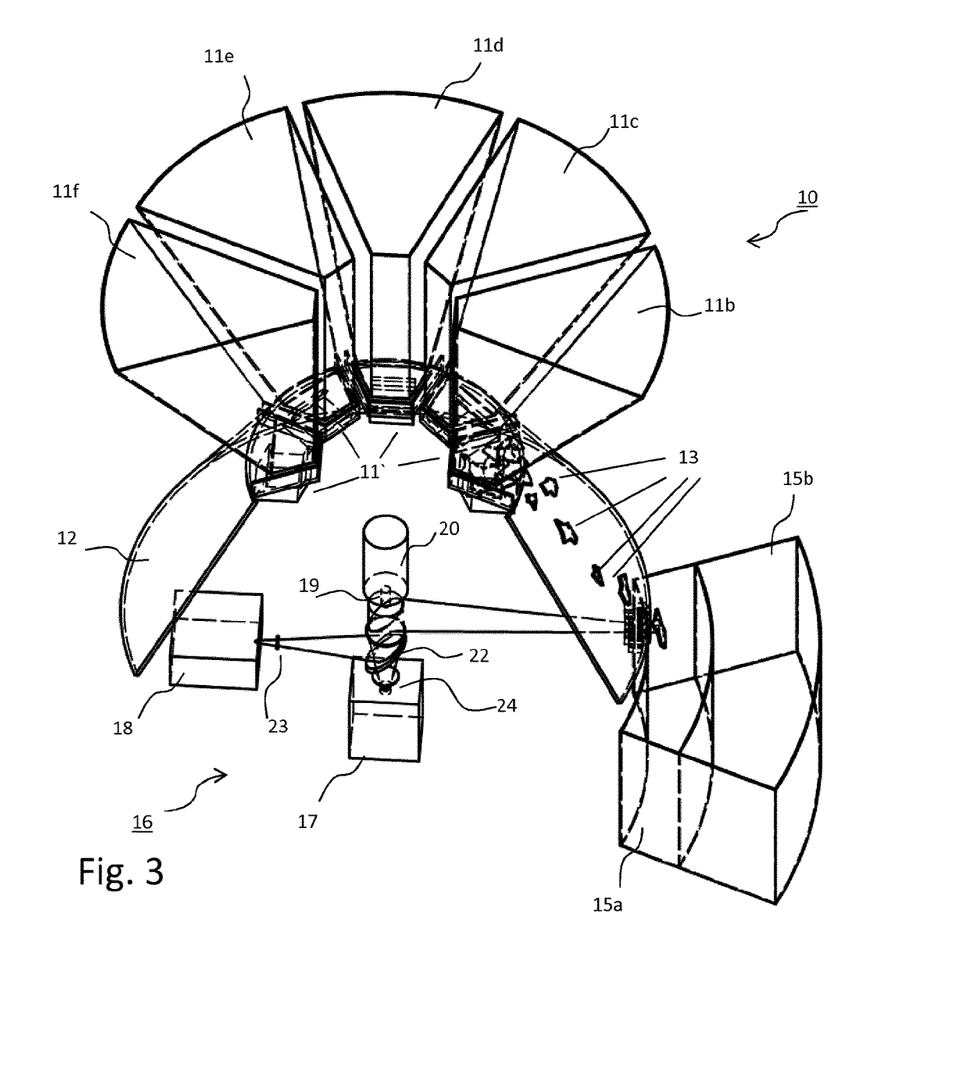
FIG. 3 shows the sorting installation of FIG. 1 in a longitudinal section.

The sorting installation 10, illustrated in FIGS. 1 to 3, in the upper region has eight sector-shaped silos 11*a*-11*h* which may be filled with recycling material that is comminuted to fragments and is to be sorted. A rotationally symmetrical directing apparatus 12 by way of which the recycling material from the sector-shaped silos 11a to 11h slides downward under the influence of gravity is disposed below the sector-shaped silos 11a to 11h. The fragments of the recycling material that are filled into the individual silos 11a to 11h herein at the lower side of the silos are directed onto the incline of the directing apparatus 12 with the aid of vibration conveyors 11'. A dedicated vibration conveyor 11' is assigned to each of the silos 11a to 11h. The vibration conveyors 11' are disposed below the sector-shaped silos 11a to 11h and convey in a metered manner the recycling material that has been filled into the respective silo onto the directing apparatus 12. The conveying quantity of the vibration conveyors 11' is adjustable such that the respective material stream may be regulated in order for the mass throughput and the sorting result to be optimized, that is to say in order to minimize sorting errors.

The directing apparatus 12 may be manufactured from stainless steel-sheet, for example, and in the exemplary embodiment has the shape of a downwardly widening truncated cone. The individual fragments 13 that slide downward from one of the silos 11a to 11h by way of the directing apparatus 12 form a material stream which en route to the bottom is spread out and distributed by the downwardly widening shape of the directing apparatus 12, due to which the individual fragments 13 are singularized. The directing apparatus 12 thus serves as a singularizing area, wherein a further advantage of the rotationally symmetrical shape lies in that fragments may be singularized in the horizontal and the vertical direction, specifically in a horizontal manner by the downwardly enlarging diameter of the directing apparatus 12, and in a vertical manner by the acceleration when sliding downward.

A multiplicity of compressed-air nozzles 14 that are distributed in the circumferential direction and may be selectively actuated by way of respective valves, so as to through the use of compressed-air surges selectively deflect the individual fragments 13 that are contained in the material stream after exiting the directing apparatus, are located below the directing apparatus 12. For the sake of improved clarity, only a few compressed-air nozzles 14 are shown in FIG. 1, while the row of the compressed-air nozzles in fact continues along the entire circumferential line below the directing apparatus 12.

Containers 15a, 15b shaped as ring segments which serve as selection channels for the sorted fragments 13 are located on different radii below the air nozzles 14. For example, if a fragment 13 is to be sorted into the external container 15b said fragment is deflected outward in a targeted manner by a compressed-air surge from one or a plurality of the compressed-air nozzles 14. In the absence of a corresponding compressed-air surge the respective fragment falls in a straight line into the radially inward container 15a that is disposed directly below the directing apparatus 12.

Only two selection channels or containers 15a, 15b, respectively, into which the sorted fragments 13 may make their way in a manner deflected or non-deflected by compressed-air surges are provided in the exemplary embodiment. However, if and when air nozzles are attached in front of and behind the material stream dropping down, for example, it would also be possible for more than two ring-segment shaped selection channels, so as to be able to simultaneously sort two or more dissimilar material fractions from the material stream by deflection in dissimilar directions.

For the sake of improved clarity, only the two containers 15a, 15b are shown in FIG. 1. In fact, respective selection channels or containers 15a, 15b are of course present for each of the eight sector-shaped silos 11a to 11h.

Figure 4:
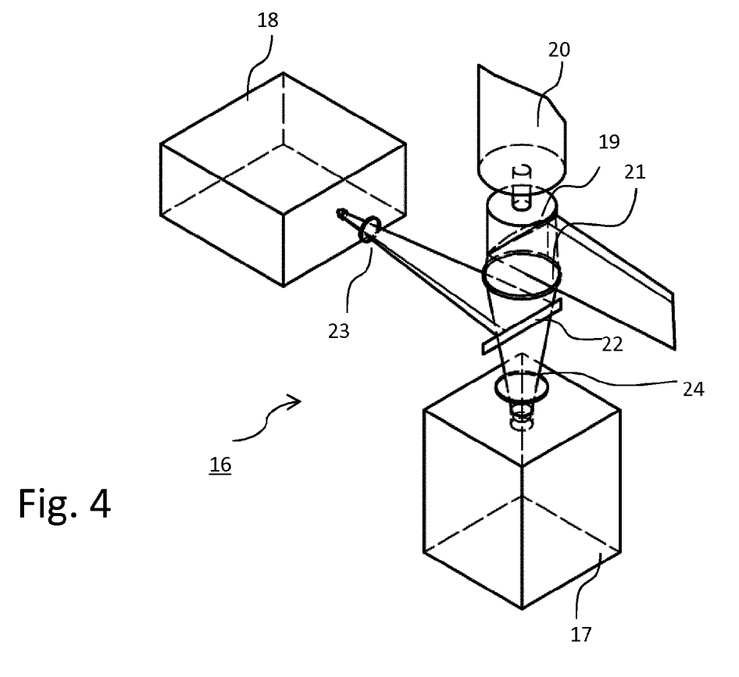
FIG. 4 shows a view of a detail of the optical scanning apparatus having a rotating deflection element.

The identification of the material composition or material properties, respectively, of the individual fragments 13, by way of which a decision has to be taken in terms of which of the selection channels 15a, 15b a fragment has to be sorted into, is performed by means of a spectroscopic measurement. An optical scanning apparatus 16 which in FIG. 4 is illustrated in an enlarged manner serves to this end. Measuring is based on the principle of the individual fragments 13 being illuminated by a light source 17, and scattered light that is reflected and remitted from the individual fragments being analyzed using a process spectrometer 18. The wavelength spectrum or frequency spectrum, respectively, of the scattered light thereby in the manner of an optical fingerprint provide information pertaining to the material consistency and composition of the respective fragments 13. The type of the material, that is to say PET, PE, PVC, PP, for example, or the like, may be determined from the spectrometric fingerprint, on the one hand. Apart therefrom, the type and composition of a material mixture, and likewise any contamination by undesirable substances such as oils, paints, resins, fuels, cleaning agents, or similar, that is to say by so-called contaminants, may however also be identified. Component parts of the material stream that by virtue of their material type, composition, or contamination are undesirable may thus be sorted from the material stream.

The wavelength of the primary light that is generated by the light source 17 herein is preferably in the ultraviolet range. One part of the primary light is reflected by the fragments 13 that are illuminated thereby, another part however is absorbed and, shifted toward longer wavelengths by way of a characteristic fluorescence spectrum, remitted again. Apart therefrom, spatial scatter also arises, contributing toward the characteristic spectrum. This fluorescence and scatter spectrum which depends on the material property and composition is analyzed in the spectrometer 18. A mercury vapor lamp or preferably a laser may be used as the light source 17, for example. The simultaneous use of two or more discrete wavelengths in the primary light may also be advantageous, leading to improved identification results. In this way, multi-line lasers or collinear laser-light bundles of dissimilar wavelengths may be used, for example.

In the case of one preferred embodiment, laser light from a YAG laser is employed, three different scanning wavelengths in the green and the UV range being generated from the laser light of the former by frequency multiplication by means of respective optical crystals. The YAG laser used in the exemplary embodiment generates a basic wavelength of 1064 nm. A first scanning wavelength of 532 nm is generated by frequency doubling; a second scanning wavelength of 354 nm is generated by frequency tripling, and a third scanning wavelength of 266 nm is generated by frequency quadrupling. The laser-light proportions of these three wavelengths are emitted by the light source 17 as a collinear light beam. The use of a plurality of wavelengths predominantly in the UV range by virtue of the high energy of the individual light quanta delivers particularly good identification results by way of which comparatively high energy levels of the radiated material may also be excited. In this manner, fragments from black material, which could not be spectroscopically identified using conventional scanning methods in the infrared range also generate an unequivocal spectrometric fingerprint, and may thus be selected.

In the exemplary embodiment, a light beam which by way of a rotating deflection element 19 is deflected and which intersects the material stream below the directing apparatus 12 in a horizontal scanning plane is generated by the light source 17. Without the invention being limited thereto, an obliquely disposed mirror 19 which is set in rotation by an electric motor 20 serves as a deflection element. The light-entrance angle of the primary light beam herein is along the axis of the directing apparatus 12 of a truncated-cone shape. The mirror 19 is inclined by approximately 45° in relation to the axially parallel direction, deflecting the primary light beam into the scanning plane by approximately 90°.

Moreover, focusing optics, for example a collimating lens 21, which focus the primary light beam that is generated by the light source 17 onto a circle in which the scanning plane intersects the material stream are disposed in the light path. In the reverse direction, remitted scattered light is again deflected in the axial direction by way of the mirror 19, is depicted by way of the collimating lens 21, and is deflected horizontally to the process spectrometer 18 by way of a dichroitic mirror 22 that is located in the beam path and serves as a beam splitter.

The deflection mirror 19 and the drive motor 20 form a rotary scanner by way of which the material stream in the scanning plane is optically scanned by a light spot that travels in a circular manner. Helical scanning of the material stream that slides downward or drops, respectively, along the directing apparatus 12 is created by the falling movement of the fragments 13 that superimposes the circular light movement. The rotational speed herein is preferably in the range from 8000 to 12,000 rpm. The mass throughput, depending on the revolutions of the scanner, reaches values of up to 10 t/h.

By way of the rotating mirror 19 and of the semi-transparent mirror 22 it is achieved that the primary light coming from the light source 17 and the remitted fluorescent or scattered light, respectively, that is remitted from the fragments that are illuminated by the primary light, pass the same optics 21 in opposite directions such that a particularly simple compact construction results. An optical filter 23 which filters direct scattered light, for example, that is to say light which emanates from the primary radiation of the light source 17 and which is reflected on the surfaces of the measured objects may also be disposed in front of the spectrometer 18. The optical filter 23 is therefore configured such that the former suppresses the emitted wavelength or wavelengths of the primary light source 17, respectively. A further narrow-band optical filter 24 may be additionally provided in front of the primary light source 17, so as to admit only primary light of the wavelength or wavelengths, respectively, desired for scanning.

The rotationally symmetrical geometry of the directing apparatus 12, the optical scanning apparatus being disposed in the center thereof when viewed in the vertical projection, leads to an extremely compact construction of the sorting installation which, distributed across the entire circumference of the directing apparatus, simultaneously enables a very high mass throughput of bulk material to be sorted. The individual storage silos 11a to 11h herein may simultaneously be supplied with dissimilar input fractions of recycling material. Alternatively, of course, only a single silo may also be provided, from which one material stream distributed across the entire circumference of the directing apparatus is generated and sorted. Should a plurality of storage silos for dissimilar input fractions now be provided in the exemplary embodiment, it is advisable for vertically running separation webs (not shown in the figures) which separate the individual material fractions or material streams en route to the bottom, thus avoiding intermixing of the material streams, to be provided along the directing apparatus.

A particularly compact construction of the sorting installation is enabled by the rotationally symmetrical shape of the directing apparatus. As compared to known sorting installations having a conveyor belt or an incline, the capacity of the system using the same apparatus footprint may be increased by a factor of approximately 8.

Apart from the shape of a truncated cone as shown here, the geometry of the directing apparatus 12 may have any other arbitrary shape of a rotational solid that is downwardly widening, for example have a bell shape or a bulgy shape. Apart from a round cross-sectional geometry, a shaping that deviates from the circular shape, for example a polygonal cross section, may also be chosen for the directing apparatus 12 in the context of the present invention, such that the latter is imparted the shape of a truncated pyramid. A truncated pyramid in the context of a mathematical definition is inter alia understood to be the trunk of a pyramid having a polygonal base area, for example the base area of an octagon, wherein this does not mandatorily have to be a regular polygon. Moreover, and in deviation from the mathematical definition of a pyramid, the individual sides of the "polygon" forming the base area in the context of the present invention may be outwardly curved by a specific radius.

Even if and when this is proven to be less advantageous, the circular cross-sectional shape may be deviated from, and an elliptical or oval shaping which in the context of the present invention is likewise to be considered rotationally symmetrical may be chosen. The arrangement of the optical scanning apparatus or of the rotary scanner, respectively, also does not mandatorily have to be in the exact center of the vertical projection of the directing apparatus, wherein the latter case is preferable in the interest of the best possible measured result. A directing apparatus 12 having a circular cross section and a rotary scanner that is disposed in the center of the former is however preferable in the context of the present invention, since the scanning primary light beam may be focused onto the circle in which the scanning plane intersects the dropping material stream, the light path thus being equal for all rotational angles of the rotary scanner and thus being minimal in relation to the circumference.

The directing apparatus 12 preferably has a shape that is closed along 360° and is downwardly widening, such that material streams may be distributed across the entire circumference of the directing apparatus. However, in the context of the present invention it is also possible for the directing apparatus not to be completely closed. For example, a longitudinal gap which is not available for guiding recycling material may remain in the directing apparatus. Therefore, the directing apparatus in the context of the present invention is to extend by at least 180°, preferably at least 270°, most preferably however by the full 360°. The optical scanning apparatus herein, in the vertical projection, is located in the interior of the imaginary base area, extended to 360°, of the directing apparatus 12, wherein the rotation axis of the rotary scanner is preferably congruent with the longitudinal axis of the imaginary rotational solid or truncated pyramid, respectively, extended to 360°. The use of a directing apparatus having a plurality of portions, for example two portions each of 180°, is likewise within the scope of the present invention.

In the context of the present invention a laser is preferred as the primary light source 17. This laser may be pulsed, or else operated in a continuous sweeping operation, having one or else a plurality of scanning wavelengths. Alternatively, a light source emitting in all spatial directions, such as a mercury vapor lamp, may also be used. In this case, the rotary scanner is required only for directing the scattered light that is remitted by the fragments to the spectrometer 18. A single collimating lens or a respective lens system may be used as the focusing optics 21. The use of spherical mirrors, for example of a parabolic mirror, as the rotating mirror 19 would likewise be possible.

The scattered light that is emitted from the fragments and reflected back by way of the rotary mirror 19 is spectroscopically analyzed in the process spectrometer 19. By virtue of the characteristic spectrum that arises herein and that represents an optical fingerprint of the respective fragment being scanned at that moment, it may be decided whether the latter is a "positive" fragment which may be directed from the material stream into the sorting channel for "positive materials", or a "negative" fragment which is to be sorted into the sorting channel for "negative materials". Depending on this identification result, a control system (not shown here) of a known construction type actuates the valves of the individual compressed-air nozzles 14 such that fragments of the desired material fraction that have been identified as "positive" by way of targeted compressed-air surges are deflected into the radially outward selection channel 15b, for example, while fragments that have been identified as "negative" drop into the selection channel 15a.

While the sorting apparatus in the exemplary embodiment has been described in the context of sorting plastics materials and other recycling material, the use thereof is however not limited to this range of applications. Rather, other mixtures of free-flowing bulk material, for example in the foodstuff sector (nuts, or similar) or in the field of mineralogy (sorting of minerals) may also be sorted by the sorting installation. Thus, when mention herein is being made of fragments to be sorted, the term fragments refers to the individual lumpy component parts that are contained in the bulk materials.

The invention claimed is:

1. A device for separating one or a plurality of material fractions from at least one material stream of free-flowing bulk material, the device comprising:
   a directing apparatus (12) by way of which the material stream is guided under the influence of gravity;
   an optical scanning apparatus (16) for spectroscopic identification of at least one of composition-dependent or consistency-dependent properties of individual fragments (13) that are contained in the material stream; and
   a separation apparatus (14) for mechanically separating the individual fragments that are contained in the material stream, depending on identification results of the optical scanning apparatus (16);
   the directing apparatus (12) is configured as a shell surface of a downwardly widening rotational solid or truncated pyramid; and
   the optical scanning apparatus (16) has
      a light source (17), disposed within a base area of an axial projection of the rotational solid or truncated pyramid, that generates a light beam, and
      a rotating optical deflection element (19) which is disposed so as to deflect the light beam in such a manner that the light beam intersects the material stream that is distributed across the shell surface of the directing apparatus (12) in a scanning plane below the rotational solid or truncated pyramid;
   wherein a plurality of the silos which are sector-shaped silos (11a-11h) from which a plurality of material streams are routed by way of the directing apparatus (12) are disposed above the directing apparatus (12), and two or more respective selection channels (15a, 15b) that are disposed on different radii from the axis of the rotational solid or truncated pyramid are provided for each of the silos (11a-11h) below the directing apparatus (12), and
   the directing apparatus has substantially vertically running separation webs for separating dissimilar material streams en route along the directing apparatus (12).

2. The device as claimed in claim 1, wherein
   the rotating optical deflection element (19) is disposed so as to deflect the light beam in such manner that the light beam intersects the material stream in a scanning plane that is parallel with the base area of the rotational solid or truncated pyramid.

3. The device as claimed in claim 2, wherein
   the optical deflection element (19) is arranged to rotate about the axis of the rotational solid or the truncated pyramid, so as to deflect the light beam out of the axis of the rotational solid or truncated pyramid into the scanning plane.

4. The device as claimed in claim 3, wherein
   an incidence direction of the light beam runs along the axis of the rotational solid or truncated pyramid, and
   the optical deflection element (19) is inclined by approximately 45° in relation to an axially parallel direction, so as to deflect the light beam into the scanning plane by approximately 90°.

5. The device as claimed in claim 1, further comprising:
   a partially transparent mirror (22) which deflects fluorescent and scattered light that is reflected from the material stream in a reverse direction via the deflection element (19) to a spectroscopic evaluation unit (18),
   the partially transparent mirror is located in the light path between the light source (17) and the rotating optical deflection element (19).

6. The device as claimed in claim 1, further comprising:
   an optical focusing unit (21) which focuses the light beam onto a circle in which said light beam intersects the material stream is provided in the light path.

7. The device as claimed in claim 1, further comprising:
   at least one silo (11a-11h), and
   a vibration conveyor (11') assigned to the silo (11a-11h) and which is disposed for infeeding bulk material from the silo (11a-11h) to the directing apparatus (12), above the directing apparatus (12).

8. The device as claimed in claim 1, wherein
   the separation apparatus has a multiplicity of compressed-air nozzles (14) that are disposed along a circumferential line that is below that of the directing apparatus and that are selectively actuatable by way of respective valves, so as to deflect the individual fragments (13) that are contained in the material stream using compressed-air surges.

9. The device as claimed in claim 8, wherein
   mutually opposing compressed-air nozzles (14) are attached in front of and behind the material stream that drops down from the directing apparatus (12), so as to by way of deflection into dissimilar directions simultaneously sort two or more dissimilar material fractions from the material stream.

10. The device as claimed in claim 1, wherein the optical scanning apparatus (16) is configured for identifying and distinguishing fragments (13) of a particle size up to 200 mm.

11. The device as claimed in claim 1, wherein
the rotating optical deflection element (19) has a drive which is configured for driving the deflection element (19) at a frequency of more than 2000 revolutions per minute.

12. The device as claims in claim 1, wherein the material stream comprises recyclable plastics.

\* \* \* \* \*